United States Patent
Hoose et al.

(10) Patent No.: US 6,366,920 B1
(45) Date of Patent: Apr. 2, 2002

(54) AUTOMATIC INVOCATION OF OBJECTS DURING THE ENTERING OF DATA IN A DATA PROCESSING SYSTEM USER INTERFACE

(75) Inventors: Bob Hoose, Trophy Club; William J. Johnson, Flower Mound, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/431,397

(22) Filed: Apr. 28, 1995

Related U.S. Application Data (63) Continuation of application No. 08/058,344, filed on May 6, 1993.

(51) Int. Cl.$^7$ ................................................ G06F 15/40
(52) U.S. Cl. ...................................... 707/102; 707/507
(58) Field of Search .................... 395/750; 364/900; 365/518

(56) References Cited

U.S. PATENT DOCUMENTS

| | | | | |
|---|---|---|---|---|
| 4,646,250 A | * | 2/1987 | Childress | 364/518 |
| 4,939,689 A | * | 7/1990 | Davis et al. | 364/900 |
| 5,046,001 A | * | 9/1991 | Barker et al. | 364/200 |
| 5,072,412 A | * | 12/1991 | Henderson, Jr. et al. | 395/159 |
| 5,226,117 A | * | 7/1993 | Muklos | 395/157 |
| 5,303,379 A | * | 4/1994 | Khoyi et al. | 395/700 |
| 5,361,393 A | * | 11/1994 | Rossillo | 395/650 |

OTHER PUBLICATIONS

*Programmable Cursor Progression Between Entry Fields*, Authors: Eagen, et al.,pp. 1–6, Disclosure TDB n6a 11–90, p. 481–482.
*Cursorable Text Items With Programmable Work Station Cursor Movement*, Authors: Eagen, et al., pp. 1–6, Disclosure TDB n6b 11–90, p. 299–301.

* cited by examiner

*Primary Examiner*—Majid A. Banankhah
(74) *Attorney, Agent, or Firm*—Geoffrey A. Mantooth (57) ABSTRACT

In a user interface presenting one or more objects to a user, a method and system are provided for allowing the user to enter data into fields in a non-sequential manner, in order to expedite the entry of the data. The specific fields which are to be accessed and their order are predetermined by the user and stored on the data processing system. When the ordered entry is invoked, the user presses the tab key on the keyboard to move the cursor to the next field in the order. The present invention processes the tab key entry and determines if the object containing the next field is located on the user interface. If not, then the object is automatically invoked so as to expose the next field to the user. Data can then be entered into this next field. If the object that needs to be invoked is dependent on a parent object, then the present invention determines if the parent object is on the user interface, and if not invokes the parent object. The dependent object is invoked through the parent object.

10 Claims, 6 Drawing Sheets

AUTOMATIC INVOCATION OF OBJECTS DURING THE ENTERING OF DATA IN A DATA PROCESSING SYSTEM USER INTERFACE

This is a continuation of co-pending application Ser. No. 08/058,344 filed May 6, 1993.

TECHNICAL FIELD OF THE INVENTION

The present invention relates to user interfaces for data processing systems and in particular to user interfaces that allow data to be entered into plural fields among plural objects.

BACKGROUND OF THE INVENTION

The user interfaces of many application programs group data into fields. A data entry field typically has one or more spaces for data preceded by a label or field prompt. For example, a data entry field may be "Program Name: ___". When the cursor is located within a blank area of the field, and data is typed in, the application program accepts the data for a predetermined purpose. In the above example, when the cursor is located in the blank area after "Program Name", the data that is typed in and entered is accepted as the name of a program.

The user interface of an application program may have many fields. A user is able to move the cursor from data entry field to data entry field using the tab key on the keyboard. Pressing the tab key moves the cursor forward to the next sequential field (in a left-to-right order, proceeding down the screen). Thus, the user can press the tab key to position the cursor within the desired field, type data into the field, and press the tab key again to advance the cursor to the next field.

However, in some situations, the user preferred order that data is entered into the application program does not correspond to the order that the fields are presented by the user interface. In other situations, only some of the fields are used by the user. In order to skip fields to place the cursor in the desired field, the tab key is pressed several times. For repetitious data entries, such frequent use of the tab key becomes inefficient and exceedingly boring. A mouse or track ball can be used to move the cursor, but is not very efficient when the cursor must be moved between widely spaced fields.

The task of data entry is even more complicated in multi-tasking environments, wherein plural application programs can be executed at the same time. A user may have to enter related data into plural application programs. However, in prior art systems, the user must navigate through the application programs to find the appropriate fields, skipping the unnecessary fields and searching for the desired fields. This often requires the user to invoke an application program to bring a data entry field onto the user interface.

The task of entering data into fields in the order presented by an application program and the task of invoking application programs makes it difficult to train personnel in the use of the user interface.

SUMMARY OF THE INVENTION

It is an object of the present invention to provide a method and system that allows a user to enter data into plural fields on a user interface in a predetermined, nonsequential order.

It is a further object of the present invention to provide a method and system that automatically invokes an object that is required for data entry so as to expose the object, and its data entry fields, to the user interface.

The method and system of the present invention provides for the ordering of data entry into predetermined locations on one or more objects on a data processing system user interface. The present invention receives an input from a user, which input is for moving a location of the data entry to a next predetermined location. The present invention then determines if the next predetermined location is associated with an object that is present on the user interface, and if not, then invokes the object onto the user interface so as to expose the next predetermined location to the user.

In one aspect of the present invention, it is determined if the object is dependent upon a second object and if so, then the object is invoked through the second object. If the second object is not present on the user interface, then the second object is invoked onto the user interface.

In still another aspect of the present invention, there is further provided the moving of the location of data entry to the next predetermined location. The location of data entry is represented by a cursor so as to prompt the user where the data entry will occur.

With the present invention, the user at a user interface need only press a tab key or other predetermined input key to advance the cursor to the next field of data entry. The cursor advancement is automatic, even though the object containing the next field may not be on the user interface. The present invention automatically invokes the object onto the user interface and exposes the next field to the user, all with the single stroke of a tab key. The user may then enter data into this next field. The user is saved from navigating among noncontiguous fields in a single object and also among fields between plural objects. Thus, the productivity of the user is increased and training requirements are decreased.

In another aspect of the present invention, plural predetermined locations are configured into an ordered arrangement by merely placing an ordering character into each location and then saving the designated or ordered location. This simplifies the configuring or programming process.

DESCRIPTION OF THE INVENTION

Figure 1:
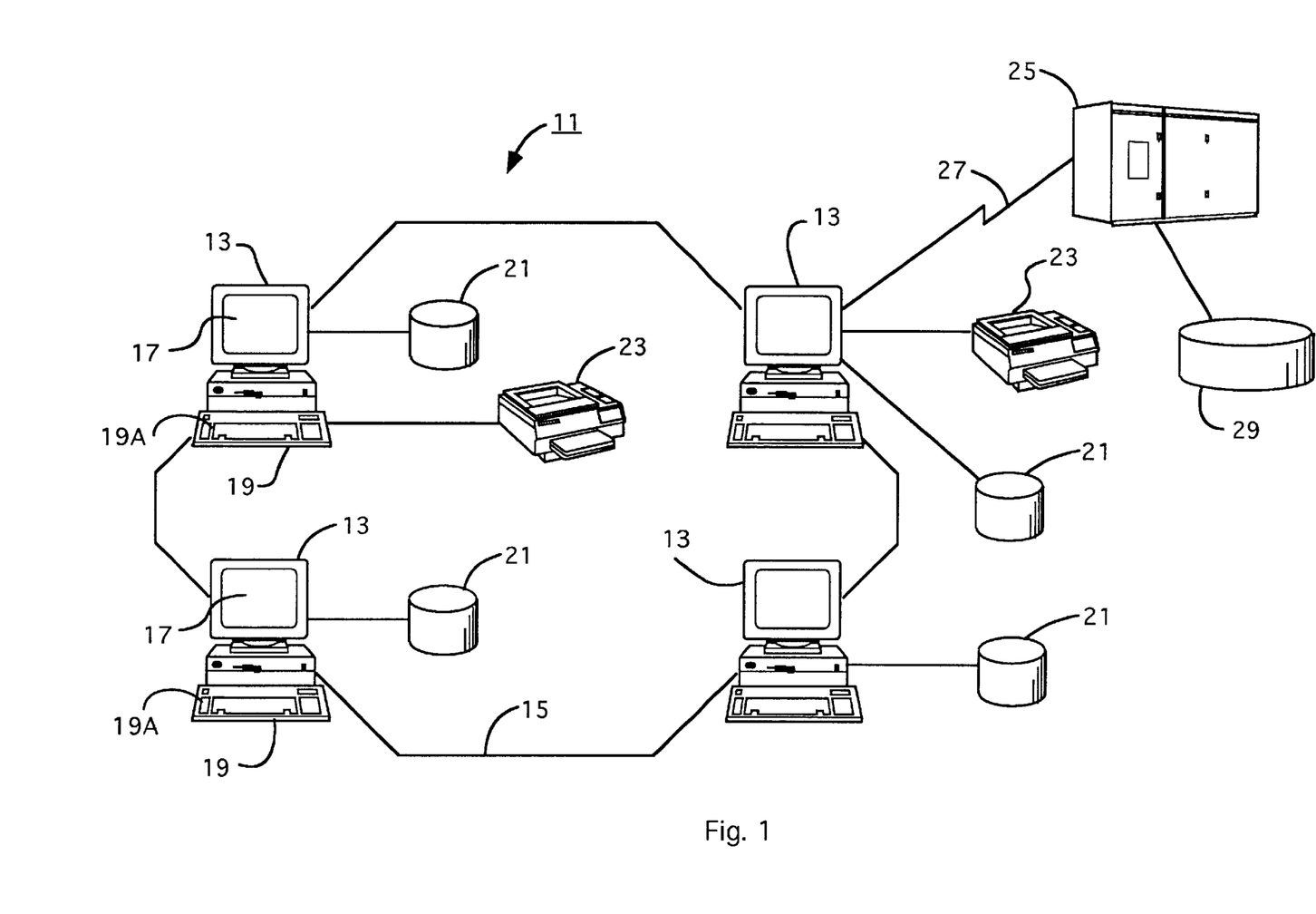
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each keyboard 19 has a tab key 19A located thereon. Each computer 13 may also be connected to a storage device 21. One or more of such storage devices 21 may be utilized, in accordance with the present invention, to store applications or resource objects which may be periodically accessed by any user within the data processing system 11.

The data processing system 11 may also include a mainframe computer 25 that is connected to one of the computers by a communication link 27. The mainframe computer 25 may also be coupled to a storage device 29 which may serve as a remote storage for the computers.

The method of the present invention for automatically invoking objects during data entry will now be described with reference to the flow charts of FIGS. 3–6. In the flow charts, the following graphical conventions are observed: a rectangle for either a process or function, a parallelogram for a screen display, a diamond for a decision and a circle or an arrow block for a connector in exiting to or entering from another part of the flow chart. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which support these languages.

Figure 3:
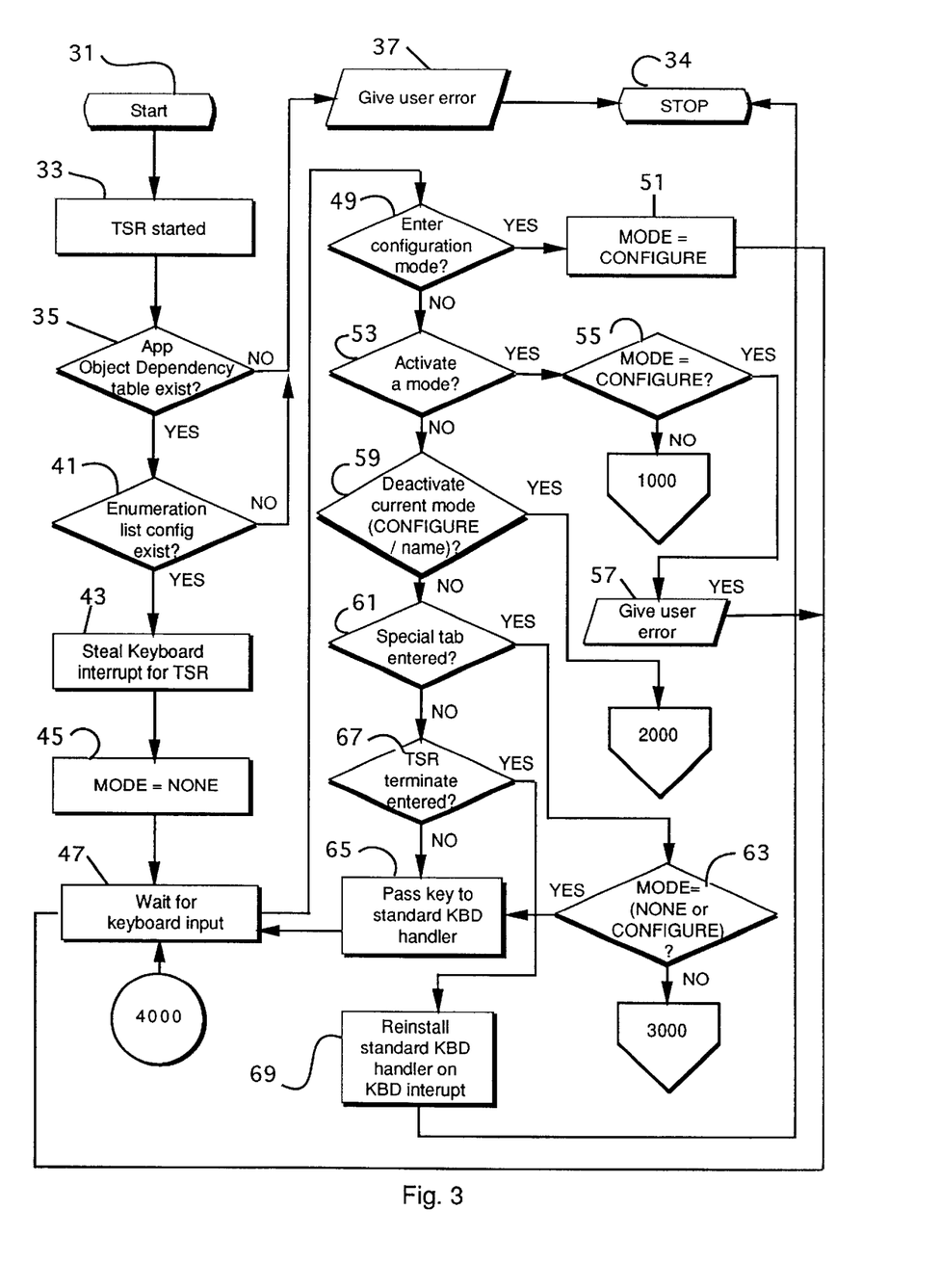
FIGS. 3–6 are flow charts showing the method of the present invention, in accordance with a preferred embodiment.

Before the specific steps are discussed, an overview of the method of the present invention will be described. In FIG. 3, the main loop of the method of the present invention is shown. In the preferred embodiment, the method is implemented as a terminate and stay resident (TSR) program on one or more of the computers 13. When a TSR program is started, it remains in the memory of the computer and is processed in the background, out of sight of the user.

All keyboard entries are passed through the method of FIG. 3 to determine the type of entry. If the keyboard entry is normal data or an entry not affiliated with the method of the present invention, then it is passed through the method of FIG. 3 and on to a standard keyboard handler. (In the absence of the method of the present invention, the keyboard entry is typically processed by the standard keyboard handler.)

Figure 5:
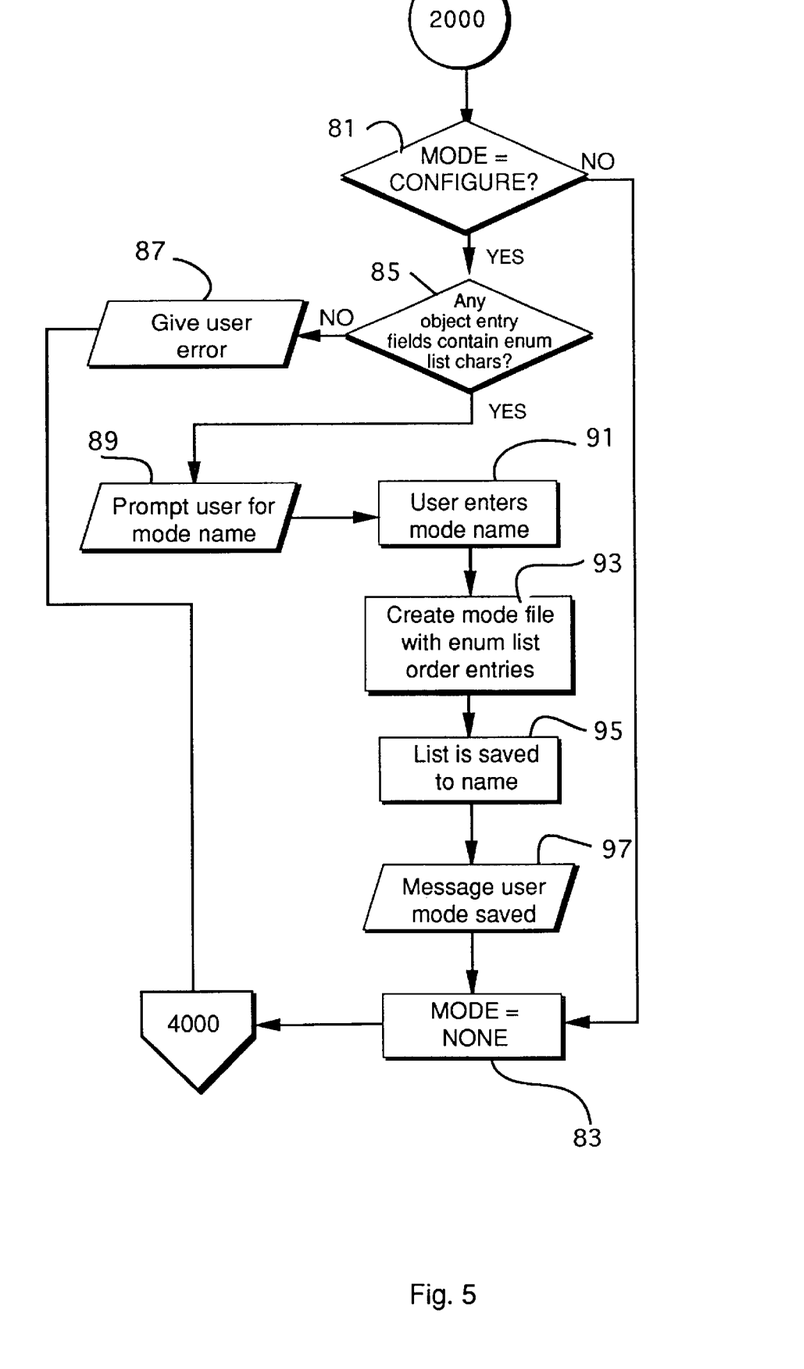

If the keyboard entry is a command to set up or program an order of tab key sequences, the entry is processed to configure a mode file. A mode file contains a listing of fields and their order. The method of FIG. 5 is used to configure a mode file.

Figure 4:
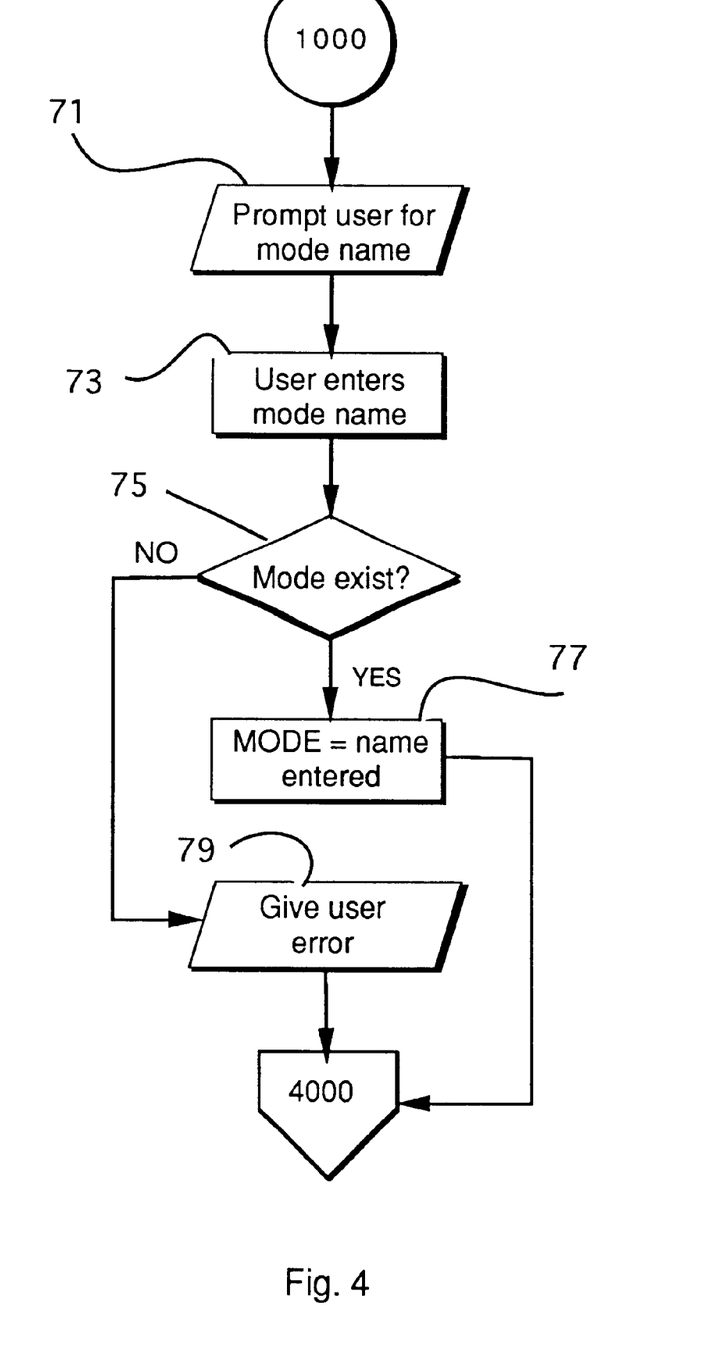

If the keyboard entry is to activate a particular mode file, then the method of FIG. 4 is implemented to activate a selected mode file.

Figure 6:
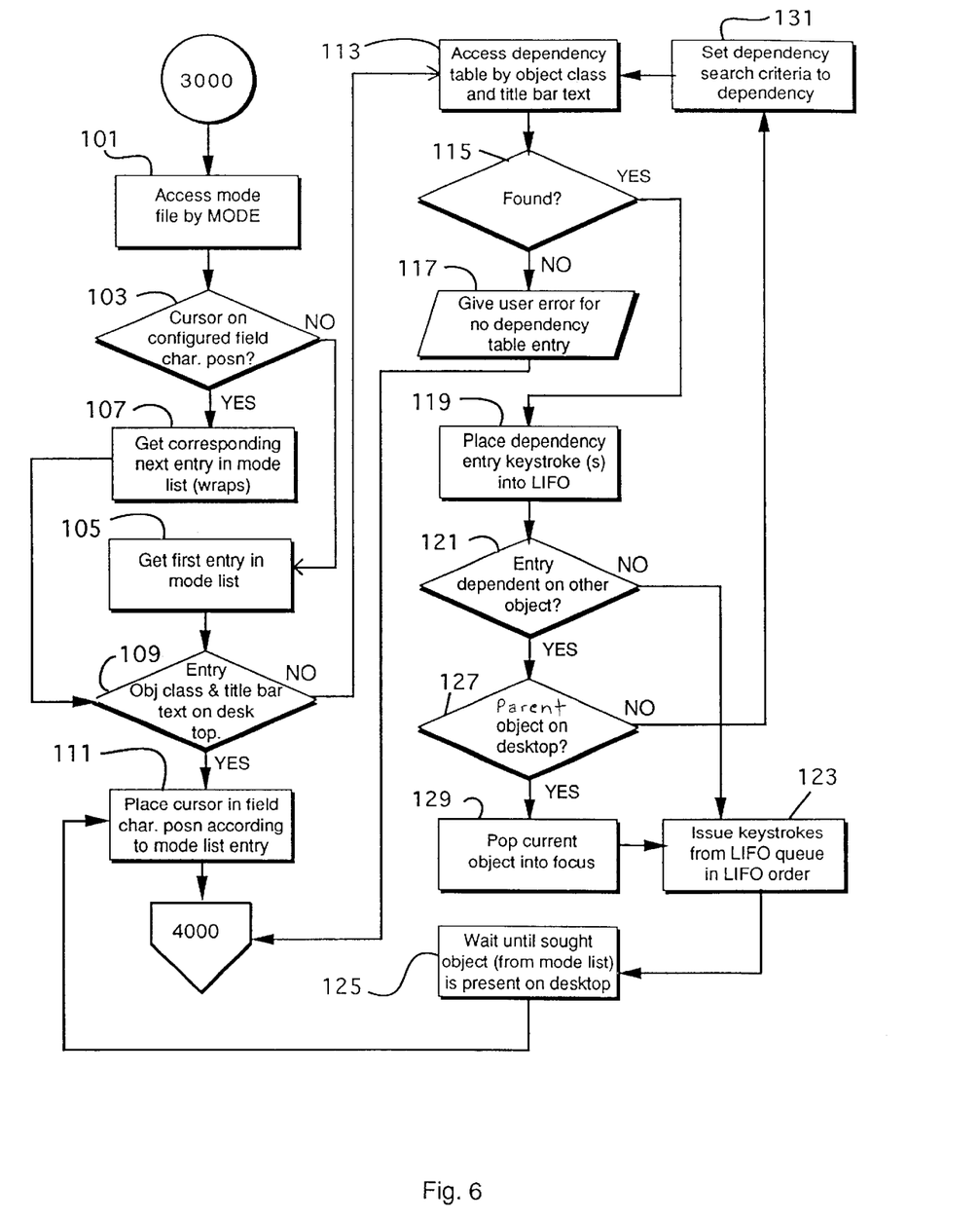

Once a mode file is activated, the user can move the cursor to preselected fields in a preselected order by pressing the tab key 19A on the keyboard. The method of FIG. 6 is implemented to properly locate the cursor in the next field. If the object containing the next field is not present on the user interface, then the method of FIG. 6 automatically invokes the object and brings it to the user interface.

If the user wishes to deactivate the mode file, then a keyboard entry is made, wherein the current mode file is exited and normal typing can resume. The method of FIG. 5 is used to deactivate the current mode file.

Figure 2:
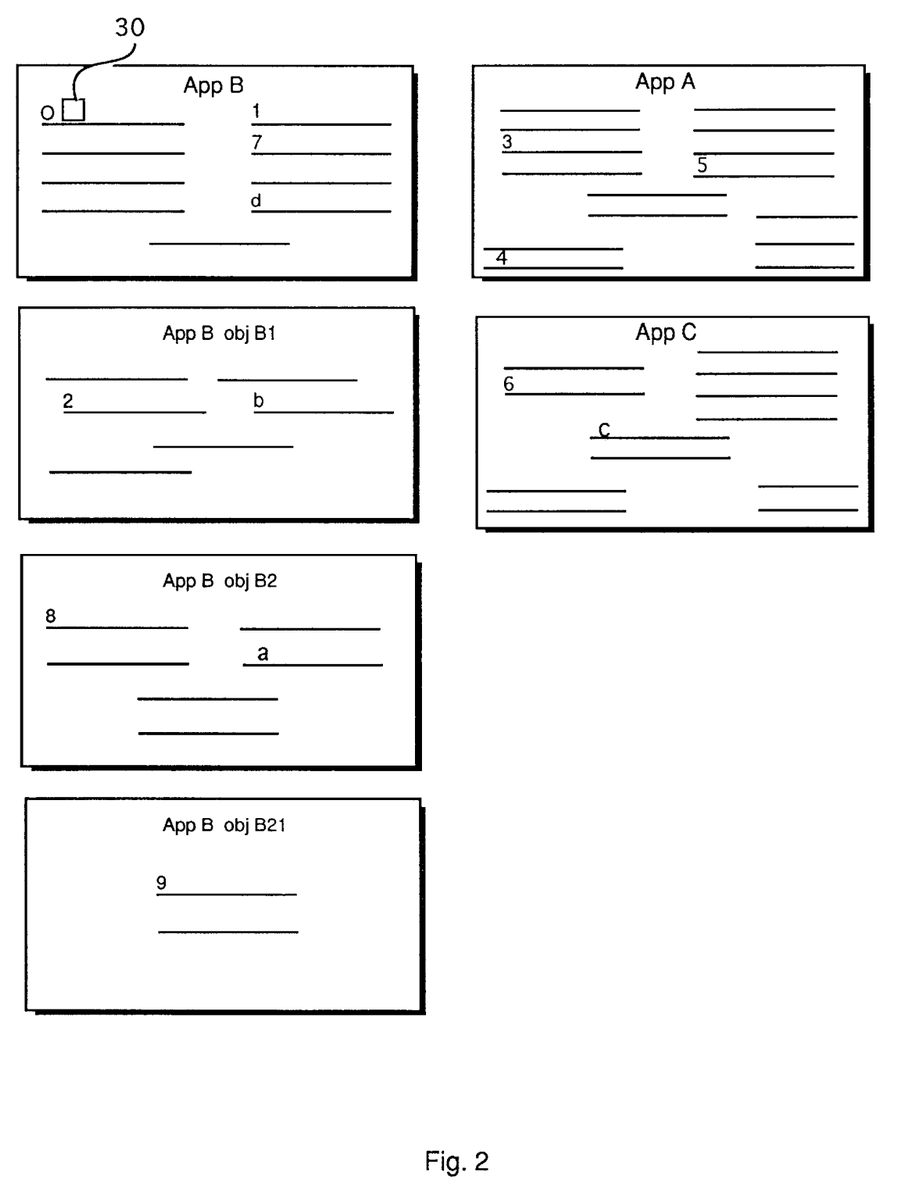
FIG. 2 is a schematic diagram showing an example of the present invention, with plural application windows on a user interface and with fields shown in an ordered arrangement.

An example of the present invention is illustrated in FIG. 2. FIG. 2 shows plural application programs on a user interface. The user interface could be a screen 17 as in FIG. 1. Each application program is represented by a window with a title bar. Thus, there is Application A (App A), Application B (App B) and Application C (App C). Application B has dependent objects, namely object B1 (App B obj B1) and object B2 (App B obj B2). Object B2 also has a dependent object, namely object B21 (App B obj B21). In the example of FIG. 2, the field prompts or labels for the fields are not shown.

In the description that follows, it will be assumed that the relevant mode file has already been activated. The order of field entries is shown by numbers and letters. When a user first begins, the cursor 30 is located in field 0, which is located in Application B. Pressing the tab key on the keyboard moves the cursor to field 1, also in Application B. After pressing the tab key to position the cursor in the desired field, the user can then type in data into the field. Pressing the tab key again moves the cursor to field 2, in Application B, object B1. If an object such as B1 is not present on the user interface, then the object is brought to the user interface and then the cursor is located in the designated field. Pressing the tab key again moves the cursor to field 3 in Application A. Pressing the tab key again moves the cursor within Application A from field 3 to field 4. Pressing the tab key again moves the cursor within Application A from field 4 to field 5. Although fields 3, 4 and 5 are non-sequential as presented on the user interface of Application A, these fields are sequential when utilizing the tab key to position the cursor for data entry. Subsequent tab key entries moves the cursor to the following fields in the following order: to field 6 in Application C, to field 7 back in Application B, to field 8 in Application B, object B2, to field 9 in Application B, object B21, to field a in Application B, object B2, to field b in Application B, object B1, to field c in Application C and to field d in Application B. Thus, the user is able to enter data into selected fields and in selected application programs in a desired order.

The objects and their fields, the order of the fields and the interdependency, if any, among the objects are specified by various lists. These lists include a Mode Description List, an Enumeration List Configuration and an Object Dependency Table.

The Mode Description List (MDL) is a user created listing of fields among which the cursor is moved. The rightmost three columns of Table 1 is the Mode Description List for the example of FIG. 2. Each entry in the Mode Description List has three parameters: 1) Object Title Bar Text, 2) Object Classification and 3) the Entry Field Character Position. The Object Title Bar Text is the name of the object that is shown in the title bar of the window that presents the object to the user. As an alternative to the Title Bar Text, other identifying information for the object can be provided. The Object Classification identifies the type of object. For example, the Object Classification could be a constant value for being an application panel. The Entry Field Character Position identifies the location in the field where the cursor will automatically be placed when using the tab key with the present invention. Typically, the cursor will be located in the first character position. In the example given herein, the Entry Field Character Position is provided as the entry field name and character position therein. However, there are alternate ways to specify this parameter, such as X, Y coordinates of the field, the number of tab key entries from a home location and the number of character counts to the desired position in the field, and the number of tab key entries from an end location and the number of character counts to the desired position. Various tab location criteria may exist without departing from the spirit of the invention.

Also, while the present example uses title bar text and class for uniquely identifying user interface objects, various alternative embodiments may exist for uniquely representing a user interface object. User interface object uniqueness criteria depends upon a particular system environment.

TABLE 1

Mode Description List

| Enumeration List Configuration | Object Title Bar Text | Object Class | Entry Field Charac. Posn. |
|---|---|---|---|
| 0 | "App B" | Application Panel | field-1-char-1 |
| 1 | "App B" | Application Panel | field-2-char-1 |
| 2 | "App B obj B1" | Application Panel | field-3-char-1 |
| 3 | "App A" | Application Panel | field-5-char-1 |
| 4 | "App A" | Application Panel | field-14-char-1 |
| 5 | "App A" | Application Panel | field-8-char-1 |
| 6 | "App C" | Application Panel | field-4-char-1 |
| 7 | "App B" | Application Panel | field-4-char-1 |
| 8 | "App B obj B2 | Application Panel | field-1-char-1 |
| 9 | "App B obj B21" | Application Panel | field-1-char-1 |
| a | "App B obj B2" | Application Panel | field-4-char-1 |
| b | "App B obj B1" | Application Panel | field-4-char-1 |
| c | "App C" | Application Panel | field-7-char-1 |
| d | "App B" | Application Panel | field-8-char-1 | provides means for a user to order field positioning with single characters. The order of the characters in the list denotes the precedence order of tabbing when placing the characters in user interface object fields. However, the user should only manage MDL's.

The object Dependency Table is a system provided configuration which provides a listing of the objects that contain the desired data entry fields and also provides information on dependencies, if any, between objects. Table 2 gives the Object Dependency Table for the example of FIG. 2. In FIG. 2, Application B, objects B1 and B2 are dependent upon Application B. Application B, object B21 is dependent upon Application B, object B2. Thus, Application B, object B21 is a child object of Application B, object B2. Application B, object B2 is a child object of Application B. Each entry of the Object Dependency Table has the following parameters: 1) Object Title Bar Text, 2) Object Classification, 3) Object Dependency and 4) Invocation Keystrokes. The Object Title Bar Text and Object Classification are as described above with respect to the Mode Description List. The Object Dependency specifies the parent object. For example, when specifying the entry for Application B, object B2, the Object Dependency would be Application B, Application Panel. The Invocation Keystroke or keystrokes specifies the keystrokes needed to invoke the object. Keystrokes to invoke a dependent object are relevant when issued to the parent object.

TABLE 2

Dependency Table Configuration

| Object Title Bar Text | Object Class | Object Dependency | Invocation Keystrokes |
|---|---|---|---|
| "App A" | Application Panel | NO-DEPENDENCY | <F4><ENTER><Alt-F9> |
| "App B" | Application Panel | NO-DEPENDENCY | <F4><ENTER><Alt-F8> |
| "App C" | Application Panel | NO-DEPENDENCY | <F4><ENTER><"PGMXYZ" <ENTER> |
| "App B obj B1" | Application Panel | ["App B", Application Panel] | <Ctrl-S> |
| "App B obj B2" | Application Panel | ["App B", Application Panel] | <Ctrl-T> |
| "App B obj B21" | Application Panel | ["Appl B obj B2", Application Panel) | <Ctrl-1> |

For example, the first entry of the Mode Description List of Table 1 has the following values: Object Title Bar Text=App B; Object Classification=Application Panel; and Entry Field Character Position=field-1-char-1.

The Enumeration List Configuration is a system provided configuration which orders the list in the specific Mode Description List. In the example of FIG. 2, the Enumeration List Configuration is: 0, 1, 2, 3, 4, 5, 6, 7, 8, 9, a, b, c and d (see Table 1, wherein the Enumeration List configuration is the leftmost column). The Enumeration List Configuration The user may set up many Mode Description Lists over time. A system is preconfigured with the Enumeration List configuration and the Object Dependency Table. The information is stored in files. Alternatively, these lists and table can be provided in the data processing system by a systems engineer for various users to access and use. As will be discussed hereinafter, the user selects specific fields and their objects by entering a character from the Enumeration List Configuration into the field.

Now, the specific steps of FIGS. 3–6 will be discussed. Referring to FIG. 3, which shows the main loop of the method, the method is started, step 31. In step 33, the method, in the form of a terminate and stay resident program (TSR), is started. The TSR is started with a fully qualified path name that includes the names of the Mode Description List (MDL), the Enumeration List Configuration and the Dependency Table Configuration for each mode.

In step 35, the method determines if an Object Dependency Table exists. If NO, then the user is given an error, step 37 and the method stops, step 34. If YES, then the method proceeds to step 41, wherein the method determines if the Enumeration List Configuration exists. If the result of step 41 is NO, the method proceeds to step 37 to give the user an error message.

If the result of step 41 is YES, then the keyboard interrupt is stolen from the standard keyboard handler for the TSR, step 43. Thus, all keyboard entries are passed to the TSR for processing before the entries are passed to the standard keyboard handler or anywhere else.

In step 45, the parameter MODE is set to a default value of NONE. MODE is the name of the particular data entry sequence or MDL, as will be discussed in more detail hereinafter. In addition, the MODE variable can be set to equal CONFIGURE in order to set up a new MDL file.

In step 47, the method waits for an input from the keyboard 19. When a keyboard input is received, the method determines in steps 49–67 if the input is meaningful to the ordered entry of data. An example of a meaningful input would be a keyboard entry that activates a mode. Another example of a meaningful input is a tab key entry once a mode has been activated. Inputs that are not meaningful to the ordered entry of data are passed through to the standard keyboard handler.

More specifically, in step 49, the method determines if the keyboard entry is to enter the configuration mode. This is a well known key, such as a function key. Configuration mode is entered to create or alter a mode. If the result of step 49 is YES, then the method proceeds to step 51, where the MODE variable is set to constant value CONFIGURE. The method then returns to step 47.

If the result of step 49 is NO, the method proceeds to step 53 to determine if the keyboard entry is to activate an MDL. Activating an MDL uses a well known key. If the result of step 53 is YES, then the method proceeds to step 55. In step 55, the method determines if MODE=CONFIGURE. If YES, then a user error is given, step 57, and the method returns to step 47 to await another keyboard input. If the result of step 55 is NO, then the method of FIG. 4 is invoked. The method of FIG. 4 will be explained in more detail hereinafter.

If the result of step 53 is NO, then the method proceeds to step 59 to determine if the keyboard entry is to deactivate the current active MDL or to exit the configuration mode. If the result of step 59 is YES, then the method of FIG. 5 is invoked. Thus, the user can either deactivate the current mode or exit the configuration mode with the same keystroke or simultaneous keystrokes.

If the result of step 59 is NO, then the method proceeds to step 61, wherein it is determined if the special tab key has been entered. The tab entry becomes special when an MDL is activated. If YES, then the method proceeds to step 63 to determine if MODE=NONE or CONFIGURE. If the result of step 63 is NO, then the method of FIG. 6 is invoked, wherein the cursor is placed in the next field. If the result of step 63 is YES, then the method proceeds to step 65, wherein the keyboard entry is passed from the TSR to the standard keyboard handler. After step 65, the method waits for another keyboard input, step 47.

If the result of step 61 is NO, the special tab key has not been entered, then the method proceeds to step 67 to determine if the keyboard entry is to terminate the TSR. If the result of step 67 is YES, then the method proceeds to step 69, wherein the standard keyboard handler is reinstalled on the keyboard interrupt. After step 69, the method stops, step 34.

If the result of step 67 is NO, then the keyboard entry is passed to the standard keyboard handler, step 67. The method then waits for another keyboard input, step 47.

The activation of an MDL will now be discussed, referring to FIGS. 3 and 4. An MDL is activated when a user wishes to implement a predetermined order for data entry.

The user enters a well known key for activating an MDL. This could be, for example, <CNTL><ALT><F8>, pressed simultaneously. The input is detected, step 47. In step 53, the method determines YES, the input is to activate an MDL, and proceeds to step 55 and on to the method of FIG. 4.

Referring to FIG. 4, the method prompts the user for a mode name, step 71. In step 73, the user enters the mode name. In step 75, the method determines if the mode file exists. MDL files are created during the configuration process, which will be described hereinafter with reference to FIG. 5. If YES, then the method proceeds to step 77, wherein MODE is set to the name that is entered. After step 77, the method returns to step 47 in FIG. 1. If the result of step 75 is NO, then the user is given an error, step 79, and the method returns to step 47 in FIG. 1.

The deactivation and configuring of a mode file will now be discussed, referring to FIGS. 3 and 5. An activated mode file is deactivated when a user wishes to stop using the current mode or order for data entry. A mode file is configured when a user wishes to set up a new mode file.

To deactivate a mode file, the user enters a well known key, such as <CNTL><ALT><F9>, pressed simultaneously. This is detected in step 47 of FIG. 1. The method passes to step 59, wherein the method determines YES and proceeds to the method of FIG. 5.

Referring to FIG. 5, the method determines if the MODE variable=CONFIGURE, step 81. In deactivating an MDL file, the result is NO, because the most recent reiteration of step 49 in FIG. 3 produced a NO, bypassing step 51. The method of FIG. 5 then proceeds to step 83, wherein the MODE variable is set to NONE. The method then returns to step 47 to await another keyboard input.

Deactivation of an MDL file returns the tab key to its normal operating status. For example, after a mode file has been deactivated, pressing the tab key produces a YES result in step 61. However, step 63 produces a YES, because MODE=NONE. The tab key entry is passed to the standard keyboard handler and the method of FIG. 6 is bypassed.

To configure an MDL file, the user enters an order number for all of the desired fields, as shown in FIG. 2. Thus, the first and second fields in Application B have a 0 and 1 respectively, the third field in Application B object B1 has a 2, and so on. The user then saves the sequence to a name which can be referenced at any time. This is done by the user entering a well known key, such as <CNTL><ALT><F10>, pressed simultaneously. Referring to FIG. 3, this is detected in step 47. The result of step 49 is YES, and MODE=CONFIGURE in step 51. The method returns to step 47. When the user provides the well known key entry to deactivate configuration of an MDL, such as <CNTL><ALT><F9>, the method passes to step 59, which produces a YES. The next step is step 81 in FIG. 5, which determines if MODE=CONFIGURE. A YES is produced, and the method determines if any object entry fields contain Enumeration List characters, step 85. If NO, then the user is given an error, step 87, and the method returns to step 47 of FIG. 1. If the result of step 85 is YES, then the user is prompted for an MDL name, step 89. The user enters the MDL name under which the MDL file is to be saved, step 91. In step 93, an MDL file is based upon the Enumerated List Configuration order entries is created. An existing MDL with the same name is overwritten. In step 95, the MDL file is saved to the name that was entered in step 91. In step 97, a message is provided to the user that the MDL file was saved. In step 83, MODE is set to NONE, to exit the configure mode and the method returns to step 47.

Once a user configures an MDL file using the method of FIG. 5 and activates the MDL file using the method of FIG. 4, then the tab key is activated to a special status. Subsequent entries of the tab key will be processed using the method of FIG. 6 (having been detected by steps 61 and 63 of FIG. 3) in accordance with the activated mode file. Other key entries will pass through the method of the present invention to the standard keyboard handler of step 65, unless those keyboard entries configure, deactivate or activate a mode or terminate the TSR.

Referring to FIG. 6, processing of the special tab key entry will now be described. In step 101, the mode file named by the MODE variable is accessed. MODE is set to the MDL file name during step 77 of FIG. 4, when the MDL is activated. In step 103, the method determines if the cursor is on a field character position that is defined by one of the entries in the activated MDL. If NO, the cursor is on a field that is not defined by the activated MDL, then in step 105, the method gets the first entry from the MDL. This is to reposition the cursor into the first field as determined by the MDL. The method then proceeds to step 109. If the result of step 103 is YES, then the method proceeds to step 107 to get the corresponding next entry in the MDL. Step 107 is capable of wrapping around to the first entry from the last entry in the MDL. Thus, a user can enter a first set of data in fields 1-d and second, third, etc. sets of data in the same fields. After step 107, the method proceeds to step 109.

In step 109, the method determines if the field is on the desktop or user interface by determining if the object containing the field is on the desktop. This is done by searching for the object containing the field Object Classification and the Title Bar Text. If YES, then in step 111, the cursor is placed in the field and in the character position according the MDL entry retrieved in either steps 107 or 105. The method then returns to step 47 in FIG. 3 to await another keyboard input. Thus, the user is prompted by the cursor to enter data into this next field. Data entries are passed through to the standard keyboard handler.

If the result of step 109 is NO, the field is not on the desktop, then the method searches for the object and displays it with the field. In step 113, the method accesses the Dependency Table Configuration by the Object Classification and Title Bar Text, and searches for the object specified by the MDL entry retrieved in either step 105 or 107. If the object is not found, a NO is produced by step 115 and the user is given an error for no dependency table entry, step 117. There should never be a case of encountering step 117 with a properly preconfigured system as intended by the present invention. The method returns to step 47.

If the object is found, a YES is produced by step 115, and the method proceeds to step 119. In step 119, the method places the dependency entry keystroke or keystrokes into a last-in-first-out (LIFO) queue. These are Invocation Keystrokes for the object and are found in the Dependency Table Configuration. This is done to properly invoke the object. In step 121, the method determines if the entry is dependent on another object. If NO, then the Invocation Keystrokes are issued from the LIFO queue in LIFO order, step 123. Many objects may be invoked as the result of step 123. The method then waits until the sought object, from the MDL, is present on the desktop, step 125. After step 125, the cursor is placed in the field specified by the entry, step 111.

If the result of step 121 is YES, the entry is dependent on another object, then the method proceeds to step 127 to determine if the parent object is on the desktop. If YES, then the parent object is popped into focus, step 129 on the user interface. This readies the parent object for the invoking keystrokes of the dependent object. The method then proceeds to step 123. to step 131 to set the dependency search criteria to the parent object. From step 131, the method proceeds to step 113 to access the parent object in the Dependency Table Configuration.

The method of FIG. 6 determines whether the object containing the next field is on the user interface, and if not then brings the object to the user interface. Furthermore, if the object is dependent upon a parent object, then the method of FIG. 6 determines if the parent object is on the user interface, and if not then brings the parent object to the user interface. This enables the dependent object to be invoked and to be brought to the user interface. There may be many nested descendents from one object to another.

Referring again to the example of FIG. 2 and Tables 1 and 2, the method of FIG. 6 will be discussed. If the cursor is positioned in field 8, in Application B, object B2, then the next tab key entry (assuming an activated mode file) is processed to move the cursor to field 9 in Application B, object B21. If Application B, object B21 is not on the user interface, then the result of step 109 is NO, and the method proceeds to step 113. In step 113, the Dependency Table Configuration is accessed by Object Title Bar Text and Object Classification to find the entry for "App B obj B21". Thus, the result of step 115 is YES. The Invocation Keystrokes of <CTRL-1>are placed in the LIFO queue, step 119. In step 121, the method determines YES, that Application B, object B21 is dependent on Application B, object B2, as is evident from its Object Dependency which is obtained from the Dependency Table Configuration. In step 127, if the method determines YES, Application B, object B2 is located on the user interface. In step 129, the method pops the application panel for Application B object B2 into focus. This typically produces a brightening of colors or other eye catching aspects of the Application B object B2 panel, with a corresponding dulling of the other application panels. Then, the keystrokes from invoking Application B, object B21 are issued, step 123. Thus, the dependent object B21 is invoked from its parent object B2. The method waits until Application B, object B21 is brought to the user interface and is popped into focus, step 125. Then the cursor is located in field 9.

If both the dependent object and its parent object are not present on the user interface (for example Application B object B2 and Application B object B21), then in step 127, the result is NO and the method proceeds to step 131. In steps 113 and 115, the parameters for the parent object (Application B object B2) are found and the invoking keystrokes are placed into the LIFO queue. Thus, in step 123, when the invoking keystrokes are issued from the LIFO queue, the parent object (Application B object B2) is invoked first (from Application B) and brought to the user interface. Then the dependent object (Application B object B21) is invoked from the parent object. The dependent object is brought to the user interface wherein the cursor is placed in the appropriate field 9.

It should be noted that many ascending objects may need to be invoked before finally being able to invoke the demanded object and place the cursor accordingly. Step 123 may invoke many objects until the sought object is present as determined in step 125.

Although the present invention has been described as moving the cursor from field to field in a predetermined order using the tab key, other key or peripheral inputs could be used.

Those skilled in the art recognize that alternative embodiments will support editing existing MDL's without departing from the spirit and scope of the invention.

The foregoing disclosure and the showings made in the drawings are merely illustrative of the principles of this invention and are not to be interpreted in a limiting sense.

What we claim is:

1. A method of entering first and second data into first and second locations, said first and second locations being in respective first and second objects on a data processing system, said method being performed on said data processing system, comprising the steps of:
   a) presenting said first location to a user by way of a user interface of said data processing system, and providing a cursor at said first location on said user interface;
   b) allowing said user to enter said first data into said first location;
   c) receiving an input from said user to move said cursor to a next location;
   d) determining if said second object is present on said user interface, after receiving said input, and if so, then presenting said second location to said user by way of said user interface and providing said cursor at said second location on said user interface, and if not then bringing said second object to said user interface and presenting said second location to said user interface and providing said cursor at said second location on said user interface;
   e) determining if said second object is dependent upon another object on said data processing system and if so, then bringing said second object to said user interface through said other object;
   f) allowing said user to enter said second data into said second location.

2. The method of claim 1 wherein said step of determining if said second object is dependent upon another object further comprises the step of determining if said other object is present on said user interface and if not, then bringing said other object onto said user interface.

3. A method of entering first and second data into first and second locations, said first and second locations being in respective first and second objects on a data processing system, said method being performed on said data processing system, comprising the steps of:
   a) presenting said first location to a user by way of a user interface of said data processing system, and providing a cursor at said first location on said user interface;
   b) allowing said user to enter said first data into said first location;
   c) receiving an input from said user to move said cursor to a next location;
   d) determining if said second object is present on said user interface, after receiving said input, and if so, then presenting said second location to said user by way of said user interface and providing said cursor at said second location on said user interface, and if not then bringing said second object to said user interface and presenting said second location to said user interface and providing said cursor at said second location on said user interface;
   e) allowing said user to enter said second data into said second location; and
   f) configuring plural of said locations in an ordered arrangement by allowing said user to order said locations and saving said ordered locations.

4. The method of claim 3 wherein said step of allowing said user to order said locations further comprises the step of allowing a user to place an ordering character in each location, said ordering characters ordering said locations with respect to each other.

5. A method of entering first and second data into first and second locations, said first and second locations being in respective first and second objects on a data processing system, said method being performed on said data processing system, comprising the steps of:
   a) presenting said first location to a user by way of a user interface of said data processing system, and providing a cursor at said first location on said user interface;
   b) allowing said user to enter said first data into said first location;
   c) receiving an input from said user to move said cursor to a next location;
   d) determining if said second object is present on said user interface, after receiving said input, and if so, then presenting said second location to said user by way of said user interface and providing said cursor at said second location on said user interface, and if not then bringing said second object to said user interface and presenting said second location to said user interface and providing said cursor at said second location on said user interface;

e) determining if said second object is dependent upon another object on said data processing system and if so, then bringing said second object to said user interface through said other object;

f) said step of determining if said second object is dependent upon another object further comprises the step of determining if said other object is present on said user interface and if not, then bringing said other object onto said user interface;

g) allowing said user to enter said second data into said second location;

h) configuring plural of said locations in an ordered arrangement by allowing said user to order said locations and saving said ordered locations; and i) said step of allowing said user to order said locations further comprises the step of allowing a user to place an ordering character in each location.

6. A data processing system having an apparatus for entering first and second data into first and second locations, said first and second locations being in respective first and second objects on a data processing system, comprising:

a) means for presenting said first location to a user by way of a user interface of said data processing system, and for providing a cursor at said first location on said user interface;

b) means for allowing said user to enter said first data into said first location;

c) means for receiving an input from said user to move said cursor to a next location;

d) means for determining if said second object is present on said user interface, after receiving said input and if so, then for presenting said second location to said user by way of said user interface and for providing said cursor at said second location on said user interface, and if not then for bringing said second object to said user interface and for presenting said second location to said user interface and providing said cursor at said second location on said user interface;

e) means for determining if said second object is dependent upon another object on said data processing system and if so, then for bringing said second object to said user interface through said other object; and f) means for allowing said user to enter said second data into said second location.

7. The apparatus of claim 6 wherein said means for determining if said second object is dependent upon another object further comprises means for determining if said other object is present on said user interface and if not, then for bringing said other object onto said user interface.

8. A data processing system having an apparatus for entering first and second data into first and second locations, said first and second locations being in respective first and second objects on a data processing system, comprising:

a) means for presenting said first location to a user by way of a user interface of said data processing system, and for providing a cursor at said first location on said user interface;

b) means for allowing said user to enter said first data into said first location;

c) means for receiving an input from said user to move said cursor to a next location;

d) means for determining if said second object is present on said user interface, after receiving said input, and if so, then for presenting said second location to said user by way of said user interface and for providing said cursor at said second location on said user interface, and if not then for bringing said second object to said user interface and for presenting said second location to said user interface and providing said cursor at said second location on said user interface;

e) means for allowing said user to enter said second data into said second location; and f) means for configuring plural of said locations in an ordered arrangement, said means for configuring further comprising means for allowing a user to order said locations and means for saving said ordered locations.

9. The apparatus of claim 8 wherein said means for allowing a user to order said locations further comprises means for allowing a user to place an ordering character in each location, said ordering characters ordering said locations with respect to each other.

10. A data processing system having an apparatus for entering first and second data into first and second locations, said first and second locations being in respective first and second objects on a data processing system, comprising:

a) means for presenting said first location to a user by way of a user interface of said data processing system, and for providing a cursor at said first location on said user interface;

b) means for allowing said user to enter said first data into said first location;

c) means for receiving an input from said user to move said cursor to a next location;

d) means for determining if said second object is present on said user interface, after receiving said input, and if so, then for presenting said second location to said user by way of said user interface and for providing said cursor at said second location on said user interface, and if not then for bringing said second object to said user interface and for presenting said second location to said user interface and providing said cursor at said second location on said user interface;

e) means for allowing said user to enter said second data into said second location;

f) means for determining if said second object is dependent upon another object on said data processing system and if so, then for bringing said second object to said user interface through said other object;

g) said means for determining if said second object is dependent upon another object further comprises means for determining if said other object is present on said user interface and if not, then for bringing said other object onto said user interface;

h) means for configuring plural of said locations in an ordered arrangement, said means for configuring further comprising means for allowing said user to order said locations and means for saving said ordered locations; and i) said means for allowing said user to order said locations further comprises means for allowing a user to place an ordering character in each location.

* * * * *